United States Patent
Garcia I Tormo et al.

(10) Patent No.: US 11,063,533 B2
(45) Date of Patent: Jul. 13, 2021

(54) CONTROL CIRCUIT FOR CONTROLLING A RESONANT POWER CONVERTER

(71) Applicant: KONINKLIJKE PHILIPS N.V., Eindhoven (NL)

(72) Inventors: Albert Garcia I Tormo, Eindhoven (NL); Oliver Woywode, Hamburg (DE); Christoph Kahl, Hamburg (DE); Bernhard Wagner, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 25 days.

(21) Appl. No.: 16/622,316

(22) PCT Filed: Jun. 12, 2018

(86) PCT No.: PCT/EP2018/065430
§ 371 (c)(1),
(2) Date: Dec. 13, 2019

(87) PCT Pub. No.: WO2018/234087
PCT Pub. Date: Dec. 27, 2018

(65) Prior Publication Data
US 2021/0152102 A1    May 20, 2021

(30) Foreign Application Priority Data

Jun. 20, 2017 (EP) .................... 17176852

(51) Int. Cl.
*H02M 1/00* (2006.01)
*H02M 7/5387* (2007.01)
*H02M 7/48* (2007.01)

(52) U.S. Cl.
CPC ......... *H02M 7/53871* (2013.01); *H02M 1/00* (2013.01); *H02M 2001/0058* (2013.01); *H02M 2007/4815* (2013.01)

(58) Field of Classification Search
CPC .. H02M 7/53871; H02M 1/00; H02M 1/4241; H02M 2007/4815; H02M 2001/0058; H02M 2001/0009
See application file for complete search history.

(56) References Cited

U.S. PATENT DOCUMENTS 4,864,479 A   9/1989  Steigerwald
5,157,593 A   10/1992 Jain
(Continued)

FOREIGN PATENT DOCUMENTS

CN    105007064       10/2015
EP    1432113 A1      6/2004
(Continued)

OTHER PUBLICATIONS

PCT International Search Report, International application No. PCT/EP2018/065430, dated Aug. 9, 2018.
(Continued)

*Primary Examiner* — Adolf D Berhane
(74) *Attorney, Agent, or Firm* — Larry Liberchuk

(57) ABSTRACT

The present invention relates to a control circuit (10) for controlling a resonant power converter. It is described to generate (210) a modulation signal. A carrier signal is generates (220), wherein the generation of the carrier signal comprises measuring at least one signal from the power converter. A switching signal is generated (230) that is useable to control a value of at least one magnitude of the resonant power converter based on the modulation signal and the carrier signal.

12 Claims, 3 Drawing Sheets

(56) References Cited

U.S. PATENT DOCUMENTS

| | | | |
|---|---|---|---|
| 5,559,685 A * | 9/1996 | Lauw | H02M 7/4826 |
| | | | 323/222 |
| 6,487,099 B1 | 11/2002 | Perkins | |
| 6,828,752 B2 | 12/2004 | Nakatsugawa | |
| 9,509,230 B2 | 11/2016 | Abe | |
| 10,374,520 B2 | 8/2019 | Wagner | |
| 2005/0078493 A1 | 4/2005 | Kim | |
| 2005/0105224 A1 | 5/2005 | Nishi | |
| 2009/0279336 A1 * | 11/2009 | Erdman | H02M 7/53875 |
| | | | 363/131 |
| 2009/0316442 A1 * | 12/2009 | Elferich | H02M 3/3376 |
| | | | 363/21.06 |
| 2017/0180013 A1 * | 6/2017 | Kuttan | H04B 5/0031 |

FOREIGN PATENT DOCUMENTS

| | | |
|---|---|---|
| EP | 1998432 A2 | 12/2008 |
| EP | 2073374 A1 | 6/2009 |
| EP | 2485383 A1 | 8/2012 |
| EP | 2731251 A1 | 5/2014 |
| EP | 03104493 A1 | 12/2016 |
| JP | H09149660 A | 6/1997 |
| JP | 2000341965 A | 12/2000 |
| JP | 2003235270 A | 8/2003 |
| JP | 2004274893 A | 9/2004 |
| KR | 100261949 B1 | 7/2000 |

OTHER PUBLICATIONS

Noormuhamed Thekkevalappil S. et al., "Hysteretic Pulse Width Modulation with Internally Generated Carrier for a Boost DC-DC Converter", University of Florida, 2005.

\* cited by examiner

CONTROL CIRCUIT FOR CONTROLLING A RESONANT POWER CONVERTER

FIELD OF THE INVENTION

The present invention relates to a control circuit for controlling a resonant power converter, to a power supply, to a method for controlling a resonant power converter, as well as to a computer program element and a computer readable medium.

BACKGROUND OF THE INVENTION

The general background of this invention is power conversion. Switched-mode power converters find widespread use in all kinds of power applications, from low power to high power. There exist several converter topologies and control techniques; depending on the application, a different combination of topology and control may be used. One of the most well-known and widespread used control techniques is Pulse Width Modulation (PWM).

PWM determines the switch-on and switch-off time instants by comparing a modulator signal to a carrier signal; the output is ON if the modulator is larger than the carrier, otherwise it is OFF (non-inverting PWM). The modulator signal is generated by processing some measured circuit variables and the reference which can be a constant signal (set point) but also can be a time-varying signal; it is a slow-varying signal (typically a band-limited signal, with a bandwidth much lower than the switching frequency). The carrier signal is externally generated and it is a periodic signal that sweeps all the modulator dynamic range; in this way it forces the periodic ON-OFF behaviour in the output. The frequency of the output signal corresponds to the frequency of the carrier signal. Typical carrier waveforms are triangular and sawtooth. Whilst the fixed-frequency operation of PWM is an advantage in some applications, it is also a limitation in a few of them. This is the case of quantum resonant converters (self-oscillating systems).

Resonant converters are used in mid-power and high-power applications because of the high efficiencies and voltage conversion ratios that can be achieved with them. Certainly, the intrinsic periodic behaviour of voltages and currents can be advantageously used to minimise the switching losses (zero-voltage switching or zero-current switching). Unfortunately, achieving perfectly soft transitions is very challenging to implement, since timing is critical; furthermore, if all switching events are forced to happen at the zero crossings of the resonant voltage or resonant current, the controllability of the output may be constrained (increased ripple).

The instantaneous resonant frequency of resonant converters depends not only on the dimensioning of the converter but also upon its state (i.e. the amount of energy stored in the inductors and the capacitors) and the load. Using a conventional PWM in resonant converters would force the converter to follow the carrier's switching frequency and modulator's duty cycle. Whilst the output voltage may still be controllable, internally the converter would operate under sub-optimum conditions (increased reactive power and switching losses). Note that the carrier frequency cannot be adapted to the converter's instantaneous resonant frequency, since the instantaneous frequency may change from cycle to cycle (especially during transients). The frequency for the next cycle can only be estimated.

The limitations of PWM for resonant converters are partially overcome by a variant of Pulse Frequency Modulation, PFM. In PFM for resonant converters, a constant duty cycle (normally close to 50%) is applied to a resonant converter; by varying the frequency of this signal, the output can be controlled. With an appropriate resonant converter this ensures soft switching over a wider range of operation compared to PWM, but with the drawback of increased reactive power (and thus switching losses) for a substantial part of the operation range. Furthermore, PFM can only be used for frequencies above the resonant frequency.

U.S. Pat. No. 6,487,099B1 describes a current mode controller for a series resonant power converter having a primary current, a conduction time and a pulse width modulator controller. The current mode controller having a current ramp generator in electrical communication with the primary current and being operative to generate a current ramp having a voltage proportional to the primary current. A voltage ramp generator is in electrical communication with the power converter and operative to generate a voltage ramp. The current mode controller further includes a multiplier in electrical communication with the current ramp generator and the voltage ramp generator. The multiplier being operative to generate a time-dependent current ramp having an amplitude proportional to the conduction period of the power converter. A limited voltage ramp generator operative to generate a limited voltage ramp is in electrical communication with the voltage ramp generator. In this respect, the current mode controller further includes an adder in electrical communication with the limited voltage ramp generator and the multiplier and operative to generate a controlling ramp proportional to the limited voltage ramp and the time-dependent current ramp. As such, the adder is in electrical communication with the pulse width modulator controller such that the controlling ramp controls the conduction period of the power converter.

SUMMARY OF THE INVENTION

It would be advantageous to have an improved control circuit for a controlling a resonant power converter including a way of controlling that resonant power converter. The object of the present invention is solved with the subject matter of the independent claims, wherein further embodiments are incorporated in the dependent claims. It should be noted that the following described aspects and examples of the invention apply also for the resonant power converter, the power supply, the method for controlling a resonant power converter, and for the computer program element and the computer readable medium.

According to a first aspect, there is provided control circuit for controlling a resonant power converter, comprising:
  a modulator signal generator;
  a carrier signal generator; and
  a pulse width signal generator.

The modulator signal generator is configured to generate a modulation signal. The carrier signal generator is configured to generate a carrier signal, wherein the generation of the carrier signal comprises a measurement of at least one signal from the resonant power converter. The pulse width signal generator is configured to generate a switching signal that is useable to control a value of at least one magnitude of the resonant power converter based on the modulation signal and the carrier signal.

In other words, the control circuit for controlling a resonant power converter is similar to the well known pulse width modulation PWM for power converters or pulse frequency modulation PFM for power converters, but the carrier signal is generated from circuit measurements of the converter itself rather than being externally generated. To put this another way, the control circuit for controlling a resonant power converter derives the carrier signal from converter variables, which also means that the resonant power converter can determine the modulation frequency.

In this way, the control circuit for controlling a resonant power converter can generate an output in a manner like a conventional PWM on the basis of the carrier and modulator signals, for example by comparing those signals. In an example, the generation of the pulse width signal constitutes an intersective technique, in that when the reference signal is less than the modulation signal the output is in a low state otherwise it is in a high state, and where a comparator can be used.

In this manner, improved dynamics can be provided, with wider bandwidths than can be achieved with PFM (faster transients). As the control circuit for controlling a resonant power converter resembles a PWM, modelling and control-design techniques developed for PWM can be easily adopted, thereby simplifying the design of the control loop.

Also, greater compatibility with different pulse patterns is provided, where the sequence +1, −1 is useable and the sequence +1, 0 is useable and the sequence +1, 0, −1 is useable, which contrasts with PFM for example where only the sequence +1, −1 can be used.

Furthermore, full advantage of the power capabilities of resonant components is enabled, because the switching frequency (frequency of the pulse width signal) is set by the converter and as the voltage/power delivered by the converter increases, the switching frequency converges to the resonance frequency (point of maximum power transfer, hardware limits). This contrasts with PFM for example, where the external carrier frequency has to be set to a value larger than the resonance frequency, and with design margins can be of the order of a third larger than the resonance frequency thereby the present power converter can maximise power transfer over a PFM converter.

In an example, the pulse width signal generator is configured to generate the switching signal that is in the low state when the modulation signal is less than the carrier signal.

In other words, operation is similar to the PWM approach, but with the carrier frequency internally generated.

In an example, the pulse width signal generator is configured to generate the switching signal that is in the high state based on the modulation signal and the carrier signal.

In an example, the pulse width signal generator is configured to generate the switching signal that is in the high state when the modulation signal is greater than the carrier signal.

In other words, operation is similar to the PWM approach, but with the carrier frequency internally generated.

In an example, the pulse width signal generator is configured to generate the switching signal that is in an intermediate state, that is between the low state and the high state, based on the modulation signal and the carrier signal.

In the first aspect, the resonant power converter comprises a pulse duration monitor configured to measure at least one duration of the switching signal, wherein the at least one duration comprises a duration of the switching signal in a low state and a duration of the switching signal in a high state, and wherein the pulse width signal generator is configured to generate the switching signal that is in the low state when the modulation signal is greater than the carrier signal and the at least one duration of the switching signal is less than or equal to a threshold value.

Thus, if the distance between consecutive switching events becomes too short (i.e. short pulses), the length of such pulses can be extended even throughout multiple switching cycles to keep the same average values but generated with wider pulses. In other words, when the switching frequency becomes very high the control circuit for controlling a power converter can be kept in the low state in order to limit switching to a maximum switching frequency. In an example, the low state is maintained for one or more cycles.

In an example, the at least one signal from the resonant power converter from which the carrier signal is generated comprises a resonant voltage.

In an example, the at least one signal from the resonant power converter from which the carrier signal is generated comprises a resonant current.

In an example, the at least one signal from the resonant power converter from which the carrier signal is generated comprises the resonant voltage multiplied by the sign of the resonant current.

In a second aspect, there is provided a power supply, comprising:
  a resonant power converter; and
  a control circuit for controlling a resonant power converter according to the first aspect.

In a third aspect, there is provided a method for controlling a resonant power converter, comprising:
  a) generating a modulation signal;
  b) generating a carrier signal, wherein the generation of the carrier signal comprises measuring at least one signal from the power converter; and
  c) generating a switching signal that is useable to control a value of at least one magnitude of the resonant power converter based on the modulation signal and the carrier signal.

In an example, in step c) the switching signal is generated in a low state when the modulation signal is less than the carrier signal.

In an example, the method comprises step d) generating the switching signal that is in a high state based on the modulation signal and the carrier signal.

In the third aspect, the method comprises step e) measuring at least one duration of the switching signal, wherein the at least one duration comprises a duration of the switching signal in a low state and a duration of the switching signal in a high state, and wherein the method comprises step f) generating the switching signal that is in the low state when the modulation signal is greater than the carrier signal and the at least one duration of the switching signal is less than or equal to a threshold value.

According to another aspect, there is provided a computer program element controlling apparatus as previously described which, if the computer program element is executed by a processing unit, is adapted to perform the method steps as previously described.

According to another aspect, there is provided a computer readable medium having stored computer element as previously described.

The computer program element, can for example be a software program but can also be a FPGA, a PLD or any other appropriate digital means.

Advantageously, the benefits provided by any of the above aspects equally apply to all of the other aspects and vice versa.

The above aspects and examples will become apparent from and be elucidated with reference to the embodiments described hereinafter.

BRIEF DESCRIPTION OF THE DRAWINGS

Exemplary embodiments will be described in the following with reference to the following drawings.

DETAILED DESCRIPTION OF EMBODIMENTS

Figure 1:
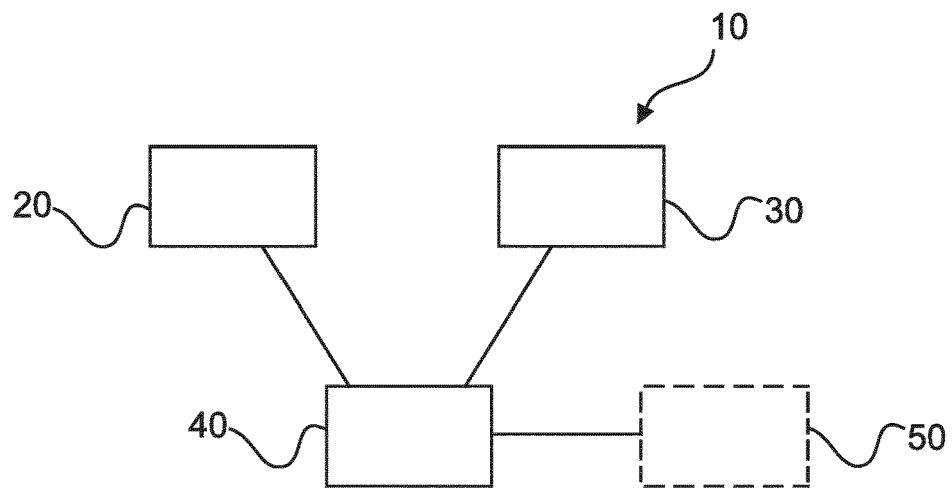
FIG. 1 shows a schematic set up of an example of a circuit for controlling a power converter.

FIG. 1 shows an example, of a control circuit 10 for controlling a resonant power converter. The control circuit 10 comprises a modulator signal generator 20, a carrier signal generator 30, and a pulse width signal generator 40. The modulator signal generator 20 is configured to generate a modulation signal. The carrier signal generator 30 is configured to generate a carrier signal. The generation of the carrier signal comprises a measurement of at least one signal from the resonant power converter. The pulse width signal generator 40 is configured to generate a switching signal that is useable to control a value of at least one magnitude of the resonant power converter based on the modulation signal and the carrier signal.

In an example, generating the switching signal based on the modulation signal and carrier signal comprises a comparison of the modulation signal and the carrier signal.

In an example, the low state comprises a state of −1.

In an example, the low state comprises a state of 0.

In an example, the modulation signal is derived (albeit indirectly) from the switching signal. In an example, the modulation signal is derived from an output voltage of the power converter that is itself derived from the switching signal. Thus, the resonant power converter itself determines the switching, or operating, frequency. To explain further, the switching signal controls switches of the converter, which control the power flow. When power flows through the converter, internal converter waveforms are generated, one of which is the output voltage. Thus, the waveform of the modulation signal is indirectly, and indeed quite remotely, related to the waveform of the switching signal. In an example, the modulation signal is derived from an output voltage of the comparator in a manner similar to that for conventional PWM. In this manner, as the control circuit for controlling a resonant power converter relies on internal waveforms of the resonant power converter to generate both the carrier signal and modulation signal, better transient behaviour and better controllability of the converter's variables are provided.

In an example, the resonant power converter is a series-parallel LCC resonant converter. In an example, the resonant power converter is a series LC resonant converter. In an example, the resonant power converter is a parallel LC resonant converter.

In an example the at least one magnitude of the resonant power converter being controlled comprises a voltage. In an example the at least one magnitude of the resonant power converter being controlled comprises a current. In an example the at least one magnitude of the resonant power converter being controlled comprises a power. In other words, the control circuit can control one or more of a voltage, current or power of the resonant power converter.

In an example, the at least one signal from the resonant power converter from which the carrier signal is generated comprises a signal that has positive and negative values at different times. In other words, a signal from which the carrier signal is derived has a magnitude that can be measured that sweeps through both negative and positive values. In an example, the signal is periodic.

According to an example, the pulse width signal generator is configured to generate the switching signal that is in a low state when the modulation signal is less than the carrier signal.

According to an example, the pulse width signal generator is configured to generate the switching signal that is in a high state based on the modulation signal and the carrier signal.

In an example, generating a switching signal that is in a high state based on the modulation signal and carrier signal comprises a comparison of the modulation signal and the carrier signal.

In an example, the high state comprises a state of +1.

According to an example, the pulse width signal generator is configured to generate the switching signal that is in the high state when the modulation signal is greater than the carrier signal.

According to an example, the pulse width signal generator is configured to generate the switching signal that is in an intermediate state, that is between the low state and the high state, based on the modulation signal and the carrier signal.

In an example, the high state is +1, the intermediate state is 0, and the low state is −1.

According to an example, the resonant power converter comprises a pulse duration monitor 50 configured to measure at least one duration of the switching signal. The at least one duration comprises a duration of the switching signal in a low state and a duration of the switching signal in a high state. The pulse width signal generator is configured to then generate the switching signal that is in the low state when the modulation signal is greater than the carrier signal and the at least one duration of the switching signal is less than or equal to a threshold value.

According to an example, the at least one signal from the resonant power converter from which the carrier signal is generated comprises a resonant voltage.

According to an example, the at least one signal from the resonant power converter from which the carrier signal is generated comprises a resonant current.

According to an example, the at least one signal from the resonant power converter from which the carrier signal is generated comprises the resonant voltage multiplied by the sign of the resonant current.

In an example the resonant current, be it positive or negative, divided by its absolute magnitude or modulus, gives the sign of the resonant current (+1 or −1) and this is used along with the resonant voltage to generate the carrier signal.

In other words, the carrier signal can be the resonant voltage multiplied by the sign of the resonant current.

Figure 2:
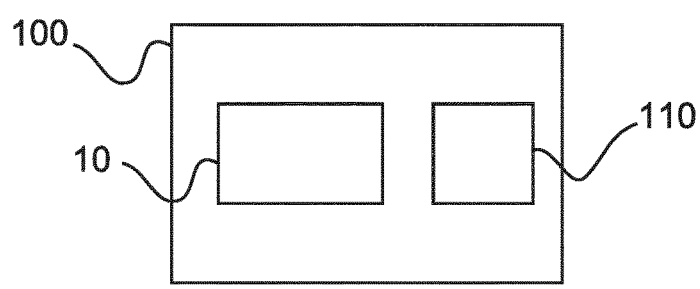
FIG. 2 shows a schematic set up of an example of a power supply.

FIG. 2 shows an example of a power supply 100. The power supply 100 comprises a resonant power converter 110 and a control circuit 10 for controlling a resonant power converter as described with reference to FIG. 1.

In an example, the power supply is for a medical imaging system.

Figure 3:
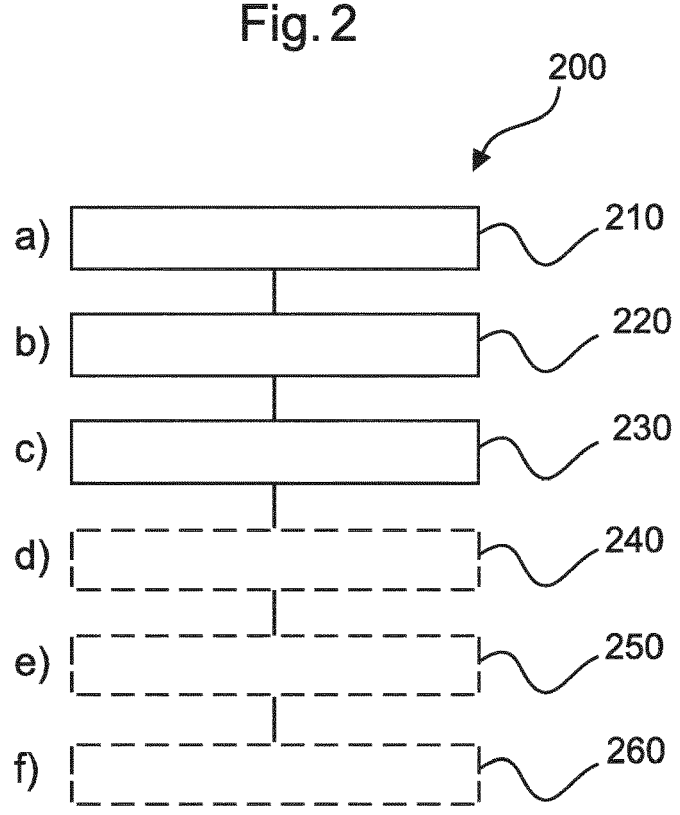
FIG. 3 shows a method for controlling a power converter.

FIG. 3 shows a method 200 for controlling a resonant power converter in its basic steps. The method 200 comprises:

in a generating step 210, also referred to as step a), generating a modulation signal;

in a generating step 220, also referred to as step b), generating a carrier signal, wherein the generation of the carrier signal comprises measuring at least one signal from the power converter; and in a generating step 230, also referred to as step c), generating a switching signal that is useable to control a value of at least one magnitude of the resonant power converter based on the modulation signal and the carrier signal.

In the example, some steps can be carried out after other steps, or in parallel with other steps, or overlapping in time with other steps.

In an example, the modulation signal is generated with a modulation signal generator.

In an example, the carrier signal is generated with a carrier signal generator.

In an example, the switching signal is generated with a pulse width signal generator.

According to an example, in step c) the switching signal is generated in a low state when the modulation signal is less than the carrier signal.

According to an example, the method comprises step d) generating 240 the switching signal that is in a high state based on the modulation signal and the carrier signal.

In an example, in step d) the switching signal is generated in the high state when the modulation signal is greater than the carrier signal.

According to an example, the method comprises step e) measuring 250 at least one duration of the switching signal, wherein the at least one duration comprises a duration of the switching signal in the low state and a duration of the switching signal in a high state, and wherein the method comprises step f) generating 260 the switching signal that is in the low state when the modulation signal is greater than the carrier signal and the at least one duration of the switching signal is less than or equal to a threshold value.

In an example, the at least one signal from which the carrier signal is generated comprises a signal that has positive and negative values at different times.

In an example, the at least one signal from the power converter from which the carrier signal is generated comprises a resonant voltage.

In an example, the at least one signal from which the carrier signal is generated comprises a resonant current.

In an example, the at least one signal from which the carrier signal is generated comprises the resonant voltage multiplied by the resonant current divided by a magnitude of the resonant current.

Figure 4:
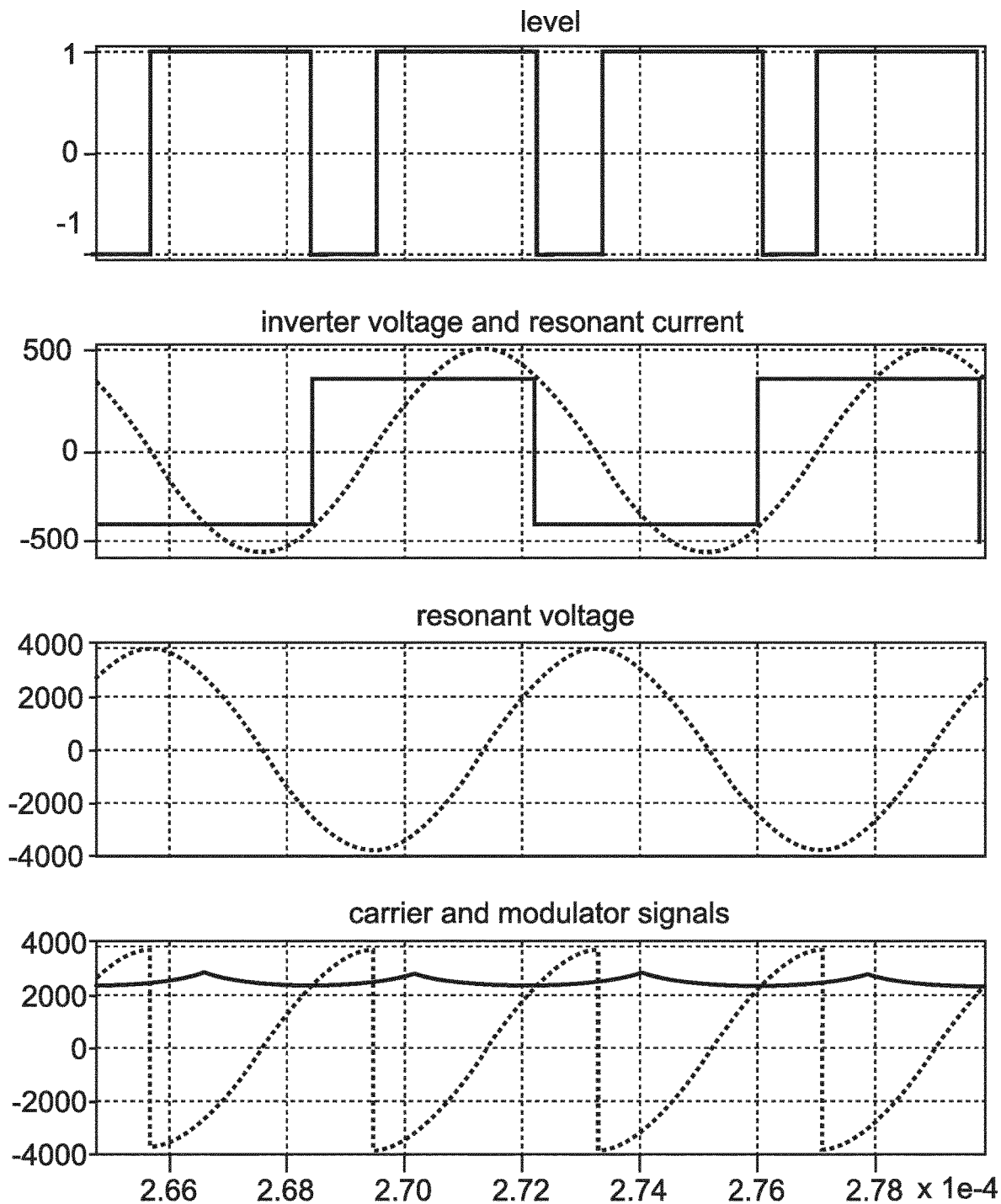
FIG. 4 shows examples of waveforms associated with the power converter.
Figure 5:
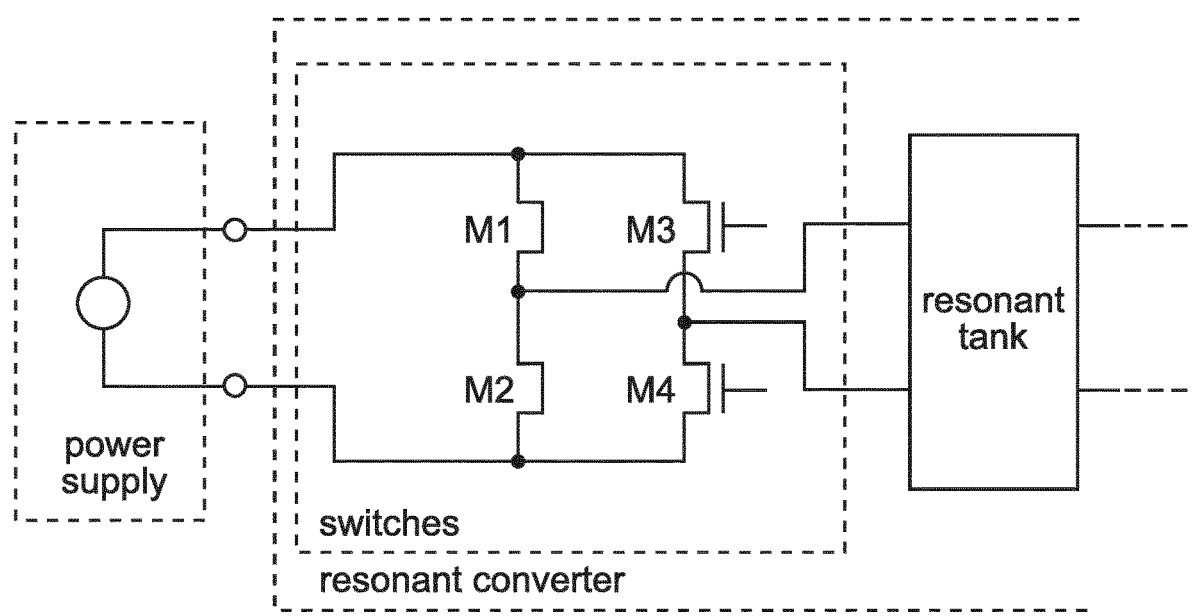
FIG. 5 shows an example of relevant elements of a resonant power converter.

The control circuit for controlling a resonant power converter, power supply and method for controlling a resonant power converter are now described in more detail in conjunction with FIGS. 4-5.

To help explain the operational architecture of the control circuit for controlling a resonant power converter this is referred to as Pulse Width Modulation for Resonant converter (PWMR) to contrast with existing PWM architectures.

PWMR is simple and similar to PWM, but with the particularity that the carrier signal is derived from converter variables. Therefore the converter determines the modulation frequency, and not the other way round as in conventional PWM structures. PWMR can be constructed in a very similar way to PWM; however, in PWMR the carrier signal is not externally generated. Instead it is measured from the actual converter. The measured magnitude should have a periodic behaviour, but it does not need to be fixed in frequency, and it must sweep negative and positive values.

Therefore, PWMR can be particular relevant for resonant converters. For PWMR the modulator signal can be generated as in conventional PWM. The output is generated by comparing the carrier and the modulator signals, just like in conventional PWM.

LCC Resonant Converter

The following relates to as specific example of PWMR in an LCC resonant converter. PWMR can be implemented in resonant LCC converters to achieve soft switching at the turn-on instant. Soft switching here refers to the voltage or current flow being close to zero at the switch point, such that losses are zero or tend to zero. The carrier signal can be derived from the resonant voltage waveform and the modulator signal can be derived from the output voltage as in regular PWM. To achieve soft switching at turn-on, the cycles have to be defined by two consecutive zero crossings of the inductor current, with each cycle ending in the ON (or +1) state and starting in the OFF (or −1) state. Since the inductor current reverses, the inverter voltage should be kept constant to switch between the −1 and +1 states (soft switching). The carrier should have waveform such as a sawtooth-like waveform, sweeping from its minimum to its maximum between every two consecutives zero crossings of the resonant current. The voltage of the resonant capacitor, multiplied by the sign of the resonant current, fulfils these requirements. This can be used as the carrier signal. Note that the amplitude of the carrier signal depends upon the operating point. This means that the carrier dynamic range will change, but so will the value of the modulator signal. It could be that the level of the modulator is above or below the carrier; in this case the converter will not switch during the cycles. FIG. 4 shows representative waveforms associated with the control circuit for controlling a power converter. The top window shows the output ON-OFF signal. The second window shows inverter voltage and resonant current (dashed line), the third window shows the resonant voltage; and the bottom window shows the carrier signal (dashed) and modulator signal.

The modulator signal can be generated as in any PWM, even based on linear control. Linear controllers are normally designed assuming that the switching frequency is constant; in this case it is not constant and therefore adaptation of the linear controller design may be required.

In the LCC resonant converter example above, only two levels were used, +1 and −1. Whilst this sequence results in reactive power at every cycle, it minimises the common-mode currents (good EMC behaviour). Furthermore, transitioning between cycles (which requires switching from −1 to +1), does not require switching as the resonant current reverses (soft-switching). At very low power, the switching frequency may become very high; it may be convenient to limit the maximum switching frequency. This can be achieved by extending the −1 level over one or more cycles. Whilst controllability may be constrained, this is generally not an issue since at very low powers the ripples are already very small.

If the inverter consists of a full-bridge, also the 0 level can be used (three levels). A possible implementation is to switch from +1 to 0 at the instant given by PWMR and then switch from 0 to −1 before the actual zero crossing of the resonant current.

PWMR can be used with other pulse sequences, which offer other features. The pulse sequence +1, 0 can also be used with PWMR. With this sequence, common-mode currents could be generated depending on how the 0 level is implemented and transitioning from the 0 to +1 requires very good synchronisation with the resonant current to avoid current spikes. On the other hand, this sequence results in a lower frequency at low power. Since PWMR relies on internal waveforms to generate both the carrier and the modulator, PWMR with these other pulse sequences continues to have better transient behaviour and better controllability of the converter's variables.

PWMR can be used in any switched-mode resonant converter. It is especially advantageous for mid-power and high-power applications, e.g. power supplies for medical imaging systems and electrical power distribution (smart grids, renewable energy).

Further details of the control circuit and method for controlling a resonant power converter as described with reference to FIG. 5. FIG. 5 shows the most relevant elements of an example of the control circuit for controlling a resonant power converter. Power switches M1, M2, M3 and M3 are provided, which connect the resonant tank to the power supply. The power switches shown here are in the form of transistors. The resonant tank is followed by a rectifier or a transformer, depending on the actual topology.

With continued reference to FIG. 5, taking the case where the current is positive (this is, it is supplied to the resonant tank from its upper node and it returns to the switches by the lower node). Then, in such a case, a +1 level would be generated by enabling switches M1 and M4 and disabling M2 and M3. A level −1 would be generated by enabling switches M2 and M3 and disabling M1 and M4. A level 0 could be generated in two different ways: either enabling M1 and M3 and disabling M2 and M4; or by enabling M2 and M4 and disabling M1 and M3.

Soft switching is referred to above, and can be explained as follows. When switching is referred to, this refers to a change in power flowing through the transistors as shown in FIG. 5. In the +1 state, the transistors let the power flow from the power supply to the resonant tank (namely, the inverter voltage and the resonant current have the same sign); in the −1 state, the transistors let the power flow from the resonant tank back to the power supply (namely, the inverter voltage and the resonant current have different signs); in the 0 level, the transistors detach the power supply from the resonant tank, so that the power supply and the resonant tank do not exchange power.

Whenever the transistors switch, some power is consumed or dissipated on the switches themselves (switching losses); these losses are related to the voltage difference at the two ends of the transistor (before and after switching) and to the current flowing through the transistor while switching (where this is actually related to the product of both). If one of the two magnitudes is (almost) zero, then the power dissipated is also (almost) zero. In such a case "soft switching" is referred to. In the other cases (when both the voltage and the current are not zero), "hard switching" is referred to. The switching losses in "hard switching" are higher than those in "soft switching"; operating under "soft switching" conditions is therefore advantageous.

Carrier and Modulator Comparison

Further detail regarding carrier and modulator signal comparison is now explained. As shown in FIG. 4, each cycle starts when the resonant current is zero and it ends once it reaches zero again. All cycles start in the +1 state and end in the −1 state, and can include the sequence +1, 0. This is captured in the lowest plot, in the discontinuities in the carrier signal. Unlike in conventional PWM, wherein the frequency of the carrier is externally generated (regardless of the actual state of the converter), in the present approach the carrier frequency (i.e. the start and stop events) are determined by the converter; in this example by the resonant current, whose waveform is the basis to generate the carrier signal. Since the frequency is set by the converter, the only degree of freedom left to control the output is the duty cycle (or switch-OFF event). Within each cycle, the controller (control circuit) compares the carrier and the modulator signals and, when they cross, it toggles the switches.

Linear Control

As discussed above, the modulator signal can be generated in many different ways. In PWM-based controllers, the modulator signal is often generated by comparing the output signal and the reference signal, eventually with some filtering/compensation; other signals may be involved as well in the generation of the modulator signal (e.g. the output voltage and an internal current). As an example, a very simple modulator signal could be generated by simply evaluating the difference between the output signal and the reference value.

In another exemplary embodiment, a computer program or computer program element is provided that is characterized by being configured to execute the method steps of the method according to one of the preceding embodiments, on an appropriate system.

The computer program element might therefore be stored on a computer unit, which might also be part of an embodiment. This computing unit may be configured to perform or induce performing of the steps of the method described above. Moreover, it may be configured to operate the components of the above described apparatus and/or system. The computing unit can be configured to operate automatically and/or to execute the orders of a user. A computer program may be loaded into a working memory of a data processor. The data processor may thus be equipped to carry out the method according to one of the preceding embodiments.

This exemplary embodiment of the invention covers both, a computer program that right from the beginning uses the invention and computer program that by means of an update turns an existing program into a program that uses invention.

Further on, the computer program element might be able to provide all necessary steps to fulfill the procedure of an exemplary embodiment of the method as described above.

According to a further exemplary embodiment of the present invention, a computer readable medium, such as a CD-ROM, USB stick or the like, is presented wherein the computer readable medium has a computer program element stored on it which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A power supply, comprising:
   a resonant power converter; and
   a control circuit for controlling the resonant power converter, the control circuit comprising:
      a modulator signal generator configured to generate a modulation signal;
      a carrier signal generator configured to generate a carrier signal by measuring at least one signal from the resonant power converter;
      a pulse width signal generator configured to generate a switching signal to control a value of at least one magnitude of the resonant power converter based on the modulation signal and the carrier signal;
   wherein the resonant power converter comprises a pulse duration monitor configured to measure at least one duration of the switching signal, wherein the at least one duration comprises a duration of the switching signal in a low state and a duration of the switching signal in a high state, and wherein the pulse width signal generator is configured to generate the switching signal that is in the low state when the modulation signal is greater than the carrier signal and the at least one duration of the switching signal is less than or equal to a threshold value.

2. The power supply according to claim 1, wherein the pulse width signal generator is configured to generate the switching signal that is in the low state when the modulation signal is less than the carrier signal.

3. The power supply according to claim 1, wherein the pulse width signal generator is configured to generate the switching signal that is in the high state based on the modulation signal and the carrier signal.

4. The power supply according to claim 3, wherein the pulse width signal generator is configured to generate the switching signal that is in the high state when the modulation signal is greater than the carrier signal.

5. The power supply according to claim 3, wherein the pulse width signal generator is configured to generate the switching signal that is in an intermediate state, between the low state and the high state, based on the modulation signal and the carrier signal.

6. The power supply according to claim 1, wherein the at least one signal from the resonant power converter from which the carrier signal is generated comprises a resonant voltage.

7. The power supply according to claim 1, wherein the at least one signal from the resonant power converter from which the carrier signal is generated comprises a resonant current.

8. The power supply according to claim 7, wherein the at least one signal from the resonant power converter from which the carrier signal is generated comprises a resonant voltage multiplied by a sign of the resonant current.

9. A method for controlling a resonant power converter, comprising:
   generating a modulation signal;
   generating a carrier signal by measuring at least one signal from the power converter;
   generating a switching signal to control a value of at least one magnitude of the resonant power converter based on the modulation signal and the carrier signal;
   measuring at least one duration of the switching signal, wherein the at least one duration comprises a duration of the switching signal in a low state and a duration of the switching signal in a high state; and
   generating the switching signal that is in the low state when the modulation signal is greater than the carrier signal and the at least one duration of the switching signal is less than or equal to a threshold value.

10. The method according to claim 9, wherein the switching signal is generated in a low state when the modulation signal is less than the carrier signal.

11. The method according to claim 9, comprising generating the switching signal that is in the high state based on the modulation signal and the carrier signal.

12. A non-transitory computer-readable medium having one or more executable instructions stored thereon which, when executed by at least one processor, cause the at least one processor to perform a method for controlling a resonant power converter, the method comprising:
   generating a modulation signal;
   generating a carrier signal by measuring at least one signal from the power converter;
   generating a switching signal to control a value of at least one magnitude of the resonant power converter based on the modulation signal and the carrier signal;
   measuring at least one duration of the switching signal, wherein the at least one duration comprises a duration of the switching signal in a low state and a duration of the switching signal in a high state; and
   generating the switching signal that is in the low state when the modulation signal is greater than the carrier signal and the at least one duration of the switching signal is less than or equal to a threshold value.

* * * * *